United States Patent
Kodiyat et al.

(10) Patent No.: US 12,487,994 B2
(45) Date of Patent: Dec. 2, 2025

(54) INTERACTIVE USER INTERFACE FOR REPORT GENERATION OF LINKED TRANSACTIONS' DATA

(71) Applicant: Intuit, Inc., Mountain View, CA (US)

(72) Inventors: Renju Kodiyat, Mountain View, CA (US); Adam Beasley, Edmonton (CA)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 18/669,209

(22) Filed: May 20, 2024

(65) Prior Publication Data

US 2024/0394250 A1 Nov. 28, 2024

Related U.S. Application Data

(60) Provisional application No. 63/468,994, filed on May 25, 2023.

(51) Int. Cl.
*G06F 16/242* (2019.01)
*G06F 16/248* (2019.01)

(52) U.S. Cl.
CPC ........ *G06F 16/2423* (2019.01); *G06F 16/248* (2019.01)

(58) Field of Classification Search
None
See application file for complete search history.

(56) References Cited

U.S. PATENT DOCUMENTS

| | | | | |
|---|---|---|---|---|
| 10,332,216 B2 * | 6/2019 | Barsade | ............... | G06Q 40/123 |
| 11,055,284 B1 * | 7/2021 | Vogelsgesang | ..... | G06F 16/2454 |
| 11,204,945 B2 * | 12/2021 | Jacobs | ............... | G06F 16/2458 |
| 11,520,463 B1 * | 12/2022 | Hofman | ............... | G06F 16/289 |
| 11,762,536 B2 * | 9/2023 | Hofman | ............... | G06F 16/212 |
| | | | | 715/765 |
| 12,182,174 B1 * | 12/2024 | Beckert | ............... | G06F 16/9577 |
| 12,189,664 B2 * | 1/2025 | Pace | ................... | G06F 16/2282 |
| 12,254,001 B2 * | 3/2025 | Kondiles | ............ | G06F 16/2379 |
| 2005/0210001 A1 * | 9/2005 | Lee | ..................... | G06F 16/2428 |
| 2020/0125239 A1 * | 4/2020 | Talbot | .................. | G06F 16/904 |

(Continued)

OTHER PUBLICATIONS

Query Execution in Column Oriented Database Systems (Year: 2008).*

(Continued)

*Primary Examiner* — Kim T Nguyen
(74) *Attorney, Agent, or Firm* — Dinsmore & Shohl LLP

(57) ABSTRACT

Certain aspects of the disclosure provide a method of constructing a report incorporating data stored in a plurality of database tables. The method generally includes receiving, via an interactive user interface (UI), a selection of a first database table, generating a visualization of data associated with the first database table organized in rows and columns, wherein each column includes data for a data field in the first database table, displaying, via the interactive UI, shared data fields associated with other related database tables and shared among all of the other database tables, receiving, via the interactive UI, a selection of a first shared data field, and displaying, via the interactive UI, data for the first shared data field from all the other database tables in a first new column added to the visualization, wherein each row in the first new column includes data from one of the other database table.

20 Claims, 12 Drawing Sheets

(56) References Cited

U.S. PATENT DOCUMENTS

| | | | |
|---|---|---|---|
| 2020/0125559 A1* | 4/2020 | Talbot | G06F 3/0486 |
| 2023/0123086 A1* | 4/2023 | Hofman | G06F 16/288 |
| | | | 715/765 |
| 2024/0378243 A1* | 11/2024 | Nhan | G06F 16/2453 |
| 2024/0394250 A1* | 11/2024 | Kodiyat | G06F 16/248 |
| 2025/0028707 A1* | 1/2025 | Kondiles | G06F 16/27 |
| 2025/0036622 A1* | 1/2025 | Dhuse | G06F 16/24568 |
| 2025/0045285 A1* | 2/2025 | Smith | G06F 16/287 |
| 2025/0053553 A1* | 2/2025 | Kondiles | G06F 16/2282 |
| 2025/0061109 A1* | 2/2025 | Darapuneni | G06F 16/26 |
| 2025/0089044 A1* | 3/2025 | Ying | H04L 1/1822 |
| 2025/0111154 A1* | 4/2025 | Bar Eliyahu | G06F 40/40 |
| 2025/0139097 A1* | 5/2025 | Schyma | G06F 16/24553 |
| 2025/0245232 A1* | 7/2025 | Lui | G06F 16/2255 |
| 2025/0258618 A1* | 8/2025 | Liu | G06F 3/0604 |

OTHER PUBLICATIONS

Improving Database Quality Through Eliminating Duplicate Records (Year: 2006).*

* cited by examiner

INTERACTIVE USER INTERFACE FOR REPORT GENERATION OF LINKED TRANSACTIONS' DATA

CROSS-REFERENCE TO RELATED APPLICATION

This Application claims the benefit of and priority to U.S. Provisional Patent Application No. 63/468,994, filed May 25, 2023, entitled "Interactive User Interface for Report Generation of Linked Transactions' Data," which is incorporated herein by reference in its entirety.

BACKGROUND

Field

Aspects of the present disclosure relate to interactive user interfaces for report generation, and more specifically, to report generation using data from a plurality of related database tables.

Description of Related Art

Every year millions of users (e.g., individuals, companies, and other institutions) receive, generate, and use electronic reports. Ideally, electronic reports present information in an organized and understandable format for a specific audience and purpose, such as to convey information, analyze an issue or problem, and/or provide a recommended course of action. In some cases, electronic reports provide a mechanism for a user to track and monitor a status of the user's business or personal finances. For example, electronic reports may allow a user to project future growth and earnings, help to appropriately allocate or reallocate finances, and/or communicate financial data to external and internal stakeholders, such as shareholders, lenders, and/or senior company management.

In some conventional approaches, computer programs are written to programmatically generate electronic reports from electronic collections of data (e.g., database tables, data lakes, data repositories, and/or other collections of related data maintained in a structured format, such as a tabular format). Such conventional approaches generally require a computer programmer to write a program to access the electronic collections of data, to format the data for visualization in a meaningful way, and to output the desired report. Typically, the computer programmer must determine the proper format for the electronic report, write a program to output the correct electronic report format, further develop the program, test the program, and release the program into a production environment for use. Such an approach for electronic report generation may be inefficient and consume significant processing and/or memory resources. Further, changing an element or graphic of the report using this approach may not be a practical task.

As such, in some other conventional approaches, user interfaces are introduced for electronic report generation. User interfaces enable non-technical users to be able to quickly and dynamically edit and generate customized, financial reports. The user interfaces are interactive such that a user may make selections, provide inputs, and/or manipulate outputs. As used herein, interacting with a user interface includes interacting using a mouse and/or keyboard, a touchscreen, augmented reality (AR)/virtual reality (VR), voice commands, and/or the like. In response to various user inputs, the system automatically accesses and traverses electronic collections of data, e.g., various database tables, and enters the traversed data from the various database tables into a desired report format. In some cases, the system further performs one or more calculations based on the traversed data and displays this information in the report format. The reports may be automatically updated based on inputs selected by the user.

SUMMARY

Certain embodiments provide a method constructing a report incorporating data stored in a plurality of database tables. The method generally includes receiving, via an interactive user interface, a selection of a first database table from the plurality of database tables displayed as a plurality of database table labels via the interactive user interface. The method generally includes generating a visualization of data associated with the selected first database table organized in one or more rows and one or more columns, wherein each of the one or more columns includes data for a data field among one or more data fields in the selected first database table. The method generally includes displaying, via the interactive user interface, one or more shared data fields associated with other database tables related to the first database table and shared among all of the other database tables. The other database tables are related to the first database table via equal values for at least one data field common to each of the other database tables and the first database table. The method generally includes receiving, via the interactive user interface, a selection of a first shared data field from the one or more shared data fields displayed. The method generally includes displaying, via the interactive user interface, data for the first shared data field from all the other database tables in a first new column added to the visualization, wherein each row in the first new column includes data from one of the other database tables.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

DESCRIPTION OF THE DRAWINGS

The appended figures depict certain aspects and are therefore not to be considered limiting of the scope of this disclosure.

FIGS. 3A-3F illustrate example report construction via the method illustrated in FIG. 2.

FIGS. 4A-4B illustrate example grouping of report data.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1A:
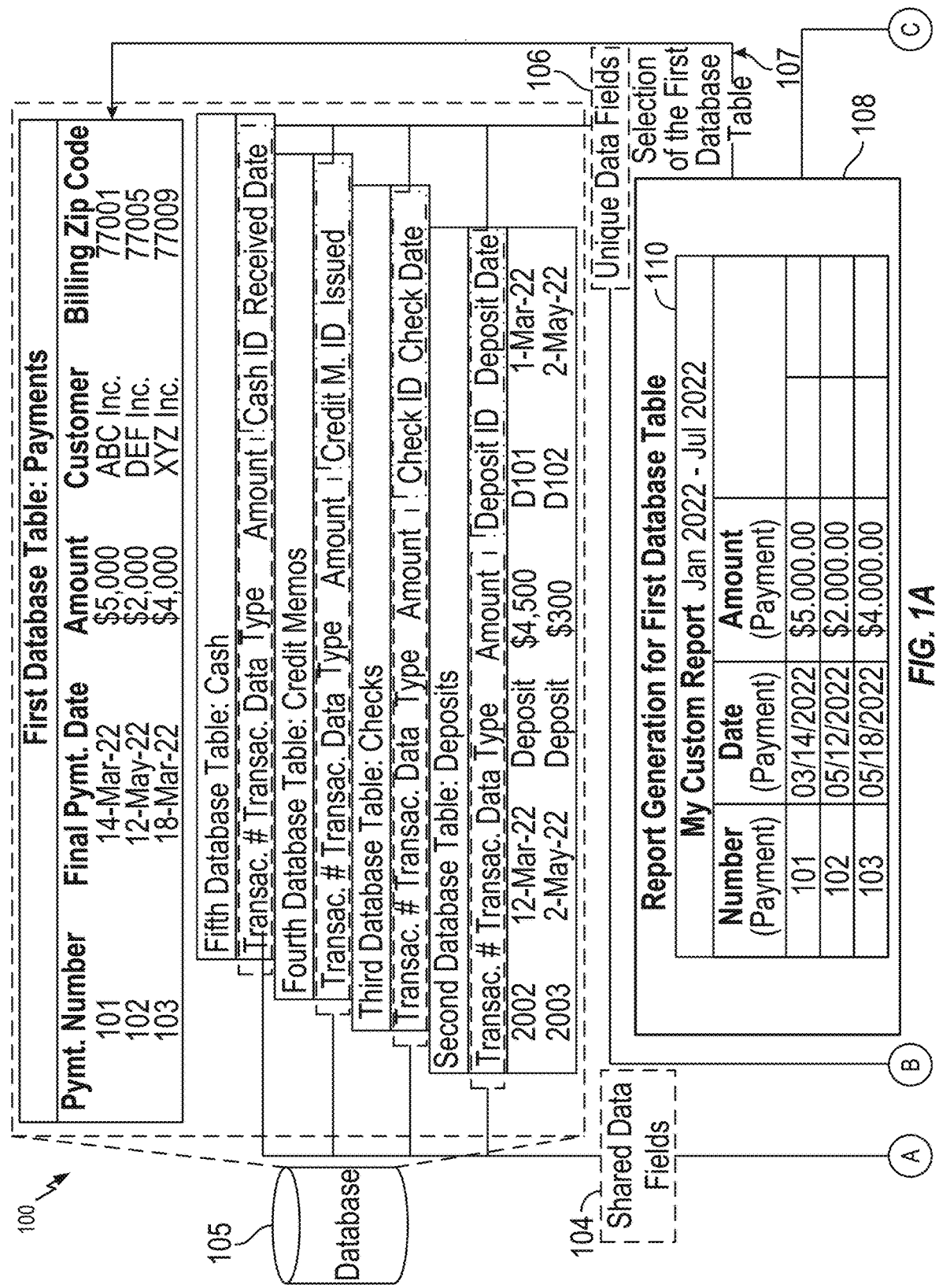
FIGS. 1A-1B illustrate an example system for constructing a report incorporating data stored in a plurality of database tables.

A system that provides a user interface for generating and/or editing reports (e.g., financial reports) may be configured to generate reports by combining data from two or more database tables to obtain the required information for analysis and reporting. Generally, to retrieve data from two or more database tables, an operation known as "JOINing" may be performed in which a relationship between database tables is established based on a related column between them. As an illustrative example, a first database table includes information about employee salaries while a second database table includes information about employee expenses. A report that compares employee salaries to employee expenses may be generated by combining some or all of the data from each of these database tables based on a shared attribute, such as an "Employee ID" column, that can be used for establishing a relationship (e.g., a JOIN) between the two database tables. In particular, in the first database table, every salary is associated with a unique employee ID of an employee within a company (e.g., in an "Employee ID" column of the first database table), and in the second database table, every expense is also associated with a unique employee ID (e.g., in an "Employee ID" column of the second database table) of an employee that incurred the expense. Given these related columns, a lookup relationship between the first database table and the second database table may be established. Subsequent to establishing the lookup column relationship, the system is enabled to automatically join data from each of these database tables, using the JOIN feature, for purposes of report generation.

In some cases, such reports are generated based on user selection of one or more data fields from one or more joined database tables. Using the above example, the first database table may include data for at least data fields "Salary Paid" and "Salary Paid Date" (e.g., where the data fields are column headers). The second database table may include data for at least data fields "Total Expense Amount" and "Expense(s) Memo." A user may select, via an interactive user interface of the system, to generate a report combining data from the "Salary Paid" data field of the first database table and the "Total Expense Amount" data field in the second database table. As such, a report may be generated having two columns of data comparing (1) a salary paid to and (2) total expenses incurred by each employee.

Information about which database tables exist, and further which database tables are joined with other database tables in a system for report generation, however, may not be information that is readily available to a user, especially in cases where thousands of database tables exist. Accordingly, identifying such relationships for comprehensive report generation presents a difficult technical problem. For example, an accountant, hired to enter and manage financial data for a company, may have knowledge of each of the financial database tables that exist in a system including, for example, database tables containing information about payments, invoices, bills, checks received, cash received, credit memos, billable expenses, salaries paid, and/or other transactions. Further, the accountant may understand that a relationship is established between bills and payments, as well as payments and checks, but not between credit memos and cash received (i.e., have an understanding of which transactions/database tables are linked/not linked). However, the accountant is only one user among many other users that may desire to generate financial reports based on such database tables, and the other users may lack knowledge of similar information. As such, overall user experience for these other users when generating financial reports may be negatively affected.

A goal of a user interface design is to make digital interaction with data as simple, fluid, intuitive, and efficient as possible. Thus, a user interface needs to be designed to anticipate needs of users and ensure ease of access, comprehension, and use, to maximize the user experience. In other words, a user interface should not be a barrier, but a path to content a user is looking for. Lack of information about joined database tables (e.g., linked transactions), however, in a system acts as a barrier that negatively contributes to overall user experience given data a user is looking for is unavailable and cannot be easily and/or efficiently determined for report generation. Further, report generation may be limited to only those database tables which a user knows about. As such, in some cases, reports generated by a user may not provide all valuable data and/or insights necessary for analysis and/or strategic decision making.

Additionally, in some cases, having information about data fields shared among related database tables may be useful information when generating reports. For example, three related database tables (e.g., JOINed tables) may include information about check transactions, cash transactions, and credit memo transactions related to different invoices. Each of the database tables may include data for a data field "Transaction Amount" (e.g., transaction amount for check transactions may be the amount identified on a cashed check, transaction amount for cash transactions may be a total amount of cash deposited, etc.). Having knowledge of data fields shared among related database tables, such as knowledge that data field "Transaction Amount" is shared among the three related database tables, may influence report generation by the user, as well as provide the user with additional information he/she may not have previously had. However, conventional user interfaces configured for report generation also fail to provide such information to a user. Further, requiring a user to identify these shared data fields is difficult where a user has no knowledge of the underlying database system.

Lastly, a user may desire to create and generate a report with a data field shared among related database tables. Functionality of conventional user interfaces may require a user to identify the data field in the different database tables and select the data field from each of the different databases to create such a report. The report created may include three columns, where each column includes data for the same data field but from each of the different database tables. This report design may not be desired by some users, and requiring a user to locate and select shared data fields among related database tables may be time-consuming and not user-friendly.

Thus a technical problem exists in the art with respect to constructing reports that incorporate data stored in a plurality of database tables. More specifically, constructing reports based on shared data fields, among related database tables, without a priori knowledge of the data fields within the related database tables. Because report generation (and its associated insights), including financial report generation for example, is an important mechanism used across a myriad of industries, there is a need for improved techniques and user interfaces for interactive report generation.

Embodiments described herein overcome the aforementioned technical problems and improve upon the state of the art by providing an improved user interface. The user interface is designed to enhance the construction of reports incorporating data stored in a plurality of database tables. For example, the improved user interface described herein is configured to identify database tables related to a selected database table and display data fields shared among the related database tables automatically without user intervention. The shared data fields may then be interacted with by a user to generate custom reports without the user having underlying knowledge about the various database tables. Specifically, the user may select one or more of the shared data fields for display in a custom report created by the user. Selection of a shared data field may cause data for the shared data field, from each of the related database tables, to be displayed in a single column in the custom report.

For example, data from a first database table selected for display in a custom report may include data related to payments. Database tables related to this payments database table may include three database tables containing information about cash transactions, credit memos, and check transactions, respectively, related to payments include in the payments database table. Each of the three database tables may include a data field related to transaction amounts. The "Transaction Amount" data field may be displayed as a column header in each of the three database tables. The improved user interface described herein may display to a user that a shared data field among the three database tables (e.g., related to the payments database table) includes a "Transaction Amount" data field. For example, in the improved user interface, a "Transaction Amount" data field label may be displayed to a user for interaction. A user may interact with the "Transaction Amount" data field label (e.g., by clicking on the label, moving the label, etc.) to add data for this shared data field, from each of the three related database tables, to the custom report (e.g., including data from the payments database table). In particular, the "Transaction Amount" data field may be added as a new column in the custom report, and data from each of the three database tables associated with the "Transaction Amount" data field may be displayed under this column in the report. For example, at least one row (e.g., a first row) in the newly added column may include transaction amount data for a cash transaction, obtained from the cash database table. At least one row (e.g., a second row) in the newly added column may include transaction amount data for a credit memo, obtained from the credit memos database table. Further, at least one row (e.g., a third row) in the newly added column may include transaction amount data for a check transaction, obtained from the check database table.

In certain aspects, in addition to displaying shared data fields, the user interface is further configured to display data field(s) belonging to less than all of the identified database tables related to a selected database table. For example, for three database tables identified to be related to a first selected database table, only one of the three database tables may include a "Memo" data field. Because the "Memo" data field belongs to less than all of the three identified database tables, the "Memo" data field may be considered to be a unique data field and displayed as such, for interaction by a user. Selection of the "Memo" data field, via the user interface, may cause data for the unique data field, from only the single database table having this data field, to be displayed in a single column in the custom report. As such, where the custom report includes cells (e.g., acting as placeholders for information in the custom report) organized in rows and columns, one or more cells in the custom report may not include any data (e.g., blank cells) given data for this data field only exists in one of the three related database tables.

Aspects described herein provide significant technical advantages over conventional user interfaces, including those described above. For example, the improved user interface described herein provides a practical way for users to identify database tables related to a selected database table. Further, the improve user interfaces allows users to more easily determine what data fields of those related database tables are shared among all of the related database tables and what data fields of those related database tables are shared with less than all of the related database tables. Providing this additional information helps to improve overall simplicity and efficiency of report generation. Further, this additional information provides a user with more data fields to select from when creating a report, thereby providing more options and greater flexibility in report generation. As such, report(s) generated may provide all valuable data and/or insights necessary for analysis and/or strategic decision making.

Notably, the improved user interface described herein can further improve the function of any existing user interface used to generate reports from electronic data. In this way, user interfaces may provide a more simple, fluid, intuitive, and efficient solution to interacting with data for report generation, and specifically data stored in a plurality of database tables, to improve overall user experience.

Figure 1B:
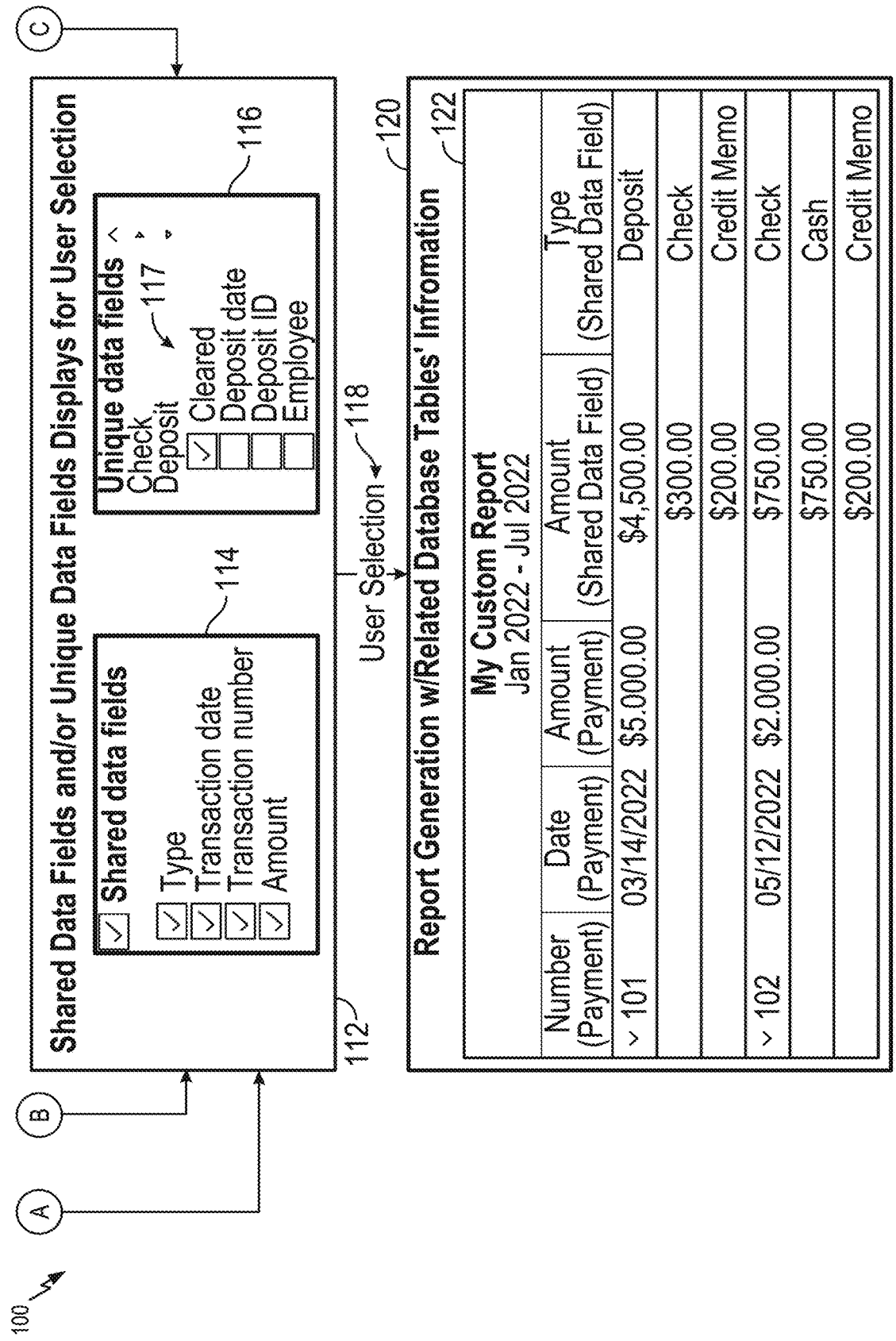

Example System for Constructing a Report Incorporating Data Stored in a Plurality of Database Tables FIGS. 1A-1B illustrate an example system 100 for constructing a report incorporating data stored in a plurality of database tables. As illustrated, system 100 is configured to identify one or more database tables related to a database table selected by a user and display, to the user via an interactive user interface, (1) shared data field(s) and/or (2) unique data field(s) of the related database table(s). The shared data field(s) and/or unique data field(s) may be displayed to the user to inform the user of different data field(s) of the related database tables that may be added to a custom report. A user may select one or more of the shared and/or unique data field(s) such that data for these data field(s), stored in one or more of the database tables, is added to the custom report. Based on the user's selection, system 100 is configured to construct a report comprising data from the first selected database table and data from one or more of the plurality of database tables related to the first selected database table.

To construct a report incorporating data stored in a plurality of database tables, system 100 begins by first receiving, at 107, a selection of a first database table. System 100 may receive this selection from a user. The user may select the first database table to indicate that data from the first database table is to be included in the report constructed by system 100. The user may select the first database table from a plurality of database tables maintained in a database 105.

In this example, the first database table is selected from five different database tables maintained in database 105 (e.g., (1) a payments database table, (2) a deposits database table, (3) a checks database table, (4) a credit memos database table, and (5) a cash database table). The first database table is a payments database table including information about different payment transactions made. For example, the first database table includes information about payments made by different customers on Mar. 14, 2022, May 12, 2022, and May 18, 2022.

In response to receiving the user selection of the first database table at 107, at 108, system 100 is configured to generate a report 110 for the first database table. Generated report 110 may be a visualization of data associated with the first database table organized in one or more rows or columns. In particular, each column may correspond to a data field, represented as a column header, in the first database table. Further, each row may correspond to a different transaction made and recorded in the first database table. Report 110 may include all, or less than all, data included in the first database table.

For example, the first database table includes five data fields: Payment Number, Final Payment Date, Amount, Customer, and Billing Zip Code data fields. However, report 110 generated, at 108, for the first database table includes only three columns corresponding to three of the five data fields included in the first database table. Specifically, report 110 includes a first column corresponding to the Payment Number data field in the first database table, a second column corresponding to the Final Payment Date data field in the first database table, and a third column corresponding to the Amount data field in the first database table.

At 112 (shown in FIG. 1B), system 100 displays, to a user via the interactive user interface, shared data fields 104 and/or unique data fields 106 associated with other database tables related to the first database table. In particular, in response to receiving the user selection of the first database table at 107, system 100 may identify other database tables related to the first database table, that are also stored in database 105. As described above, a database table may be related to another database table based on equal data values in a column/data field belonging to the database tables. System 100 may identify different data fields of each of the identified other database tables related to the first database table to determine (1) data fields belonging to all the other database tables (e.g., "shared data fields 104") and (2) data fields belonging to less than all the other database tables (e.g., "unique data fields 106").

In FIG. 1B, at 112, system 100 determines that the second database table, the third database table, the fourth database table, and the fifth database table are all database tables related to the first database table. System 100 makes this determination based on first identifying that each of these second through fifth database tables has a data field/column that is also found in the first database table, and second identifying that data values in each of the second through fifth database tables match data values in the this column of the first database table (e.g., where the common column/data field corresponds to "Payment Number," then system 100 determines that data values for "Payment Number" in each of the second through fifth database tables (not illustrated in FIG. 1A) are equal to data values for "Payment Number" in the first database table). System 100 identifies data fields in the second database table, the third database table, the fourth database table, and the fifth database table to determine data fields shared among all of these database tables and/or data fields shared with less than all of these database tables. For example, shared data fields 104 identified by system 100 include Transaction #, Transaction Date, Type, and Amount. Further, unique data fields 106 identified by system 100 include at least Deposit ID and Deposit Date data fields from the second database table, Check ID and Check Date data fields from the third database table, Credit Memo ID and Issued data fields from the fourth database table, and Cash ID and Received Date data fields from the fifth database table.

System 100 may provide a display 114 of the identified shared data fields 104 via the interactive user interface. Further, system 100 may provide a display 116 of the identified unique data fields 106 via the interactive user interface. Unique data fields 106 in display 116 may be presented in a hierarchical format, where each unique data field is shown below a label corresponding to a database table where the unique data field belongs. For example, the Cleared data field is a unique data field that belongs to the second database table (e.g., Deposits database table); thus, the Cleared data field is displayed as a child label of a Deposits database table label (shown at 117) in the user interface. Shared data fields 104 and unique data fields 106 may be displayed via the interactive user interface to enable selection of such data fields by a user. Selection of one or more of the shared data fields 104 and/or unique data fields 106 may cause data associated with these data fields, from one or more of the second through fifth database tables, to be added to the custom report 110, generated by system 100 at 108.

At 118, system 100 receives, from the user, a selection of one or more of the shared data fields 104 and/or the unique data fields 106. In this example, the user selection, received by system 100 at 118, indicates that data for the Amount data field and Type data field are to be added to the custom report 110. The Amount data field and the Type data field are shared data fields 104 (e.g., data fields that belong to each of the second through fifth database tables).

In response to receiving the user selection at 118, at 120, system 100 generates report 122. Report 122 includes data from the first database table, as well as data from the database tables related to the first database table. For example, report 122 includes data from report 110 (e.g., generated at 108) and data from all of the related database tables given the two data fields selected by the user are shared data fields. As described above, shared data fields 104 are data fields that belong to all related database tables; thus, where a shared data field 104 is selected to be included in a report, then data from all related database tables is included in report 122 for the selected shared data field 104.

Although not illustrated, in some cases the user selection received by system 100 at 118 includes a selection of one or more unique data fields 106. As described above, unique data fields 106 are data fields that belong to less than all related database tables. Thus, where a unique data field 106 is selected to be included in a report, then data from less than all the related database tables is included in the report for the selected unique data field 106.

It should be noted that the above-described database tables and their associated data fields used for report generation are only examples, and other database tables and/or data fields are possible.

System 100 may periodically or continuously update data in report 122 as it becomes available in database 105 and/or as new database tables are added to database 105. Further, system 100 may repeat the steps described above each time a user selects a new database table (e.g., at 107) and/or selects a new shared data field 104 and/or unique data field 106 (e.g., at 118).

Figure 2:
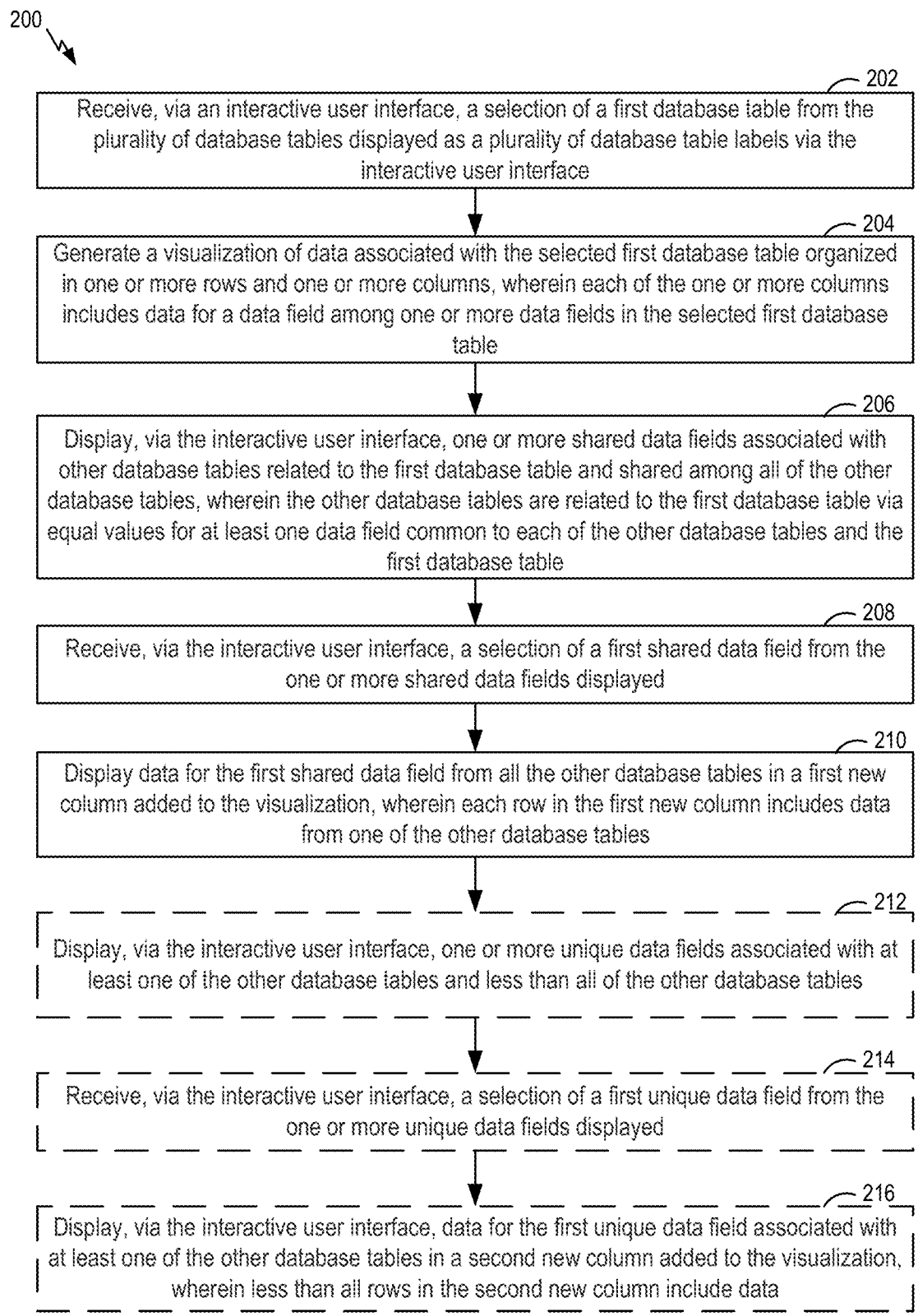
FIG. 2 illustrates an example method of constructing a report based on shared data fields associated with a plurality of related database tables.

Example Method of Constructing a Report Based on Shared Data Fields Associated with a Plurality of Related Database Tables FIG. 2 illustrates an example method 200 of constructing a report based on shared data fields associated with a plurality of related database tables. Method 200 may be performed by one or more processor(s) of a computing device, such as processor(s) 502 of processing system 500 described below with respect FIG. 5. Note that any steps illustrated with dashed lines in FIG. 2 may indicate that that step is an optional or alternative example.

FIGS. 3A-3F illustrate example report construction based on example method 200 illustrated in FIG. 2. FIGS. 2 and 3A-3F are described in conjunction below.

Figure 3A:
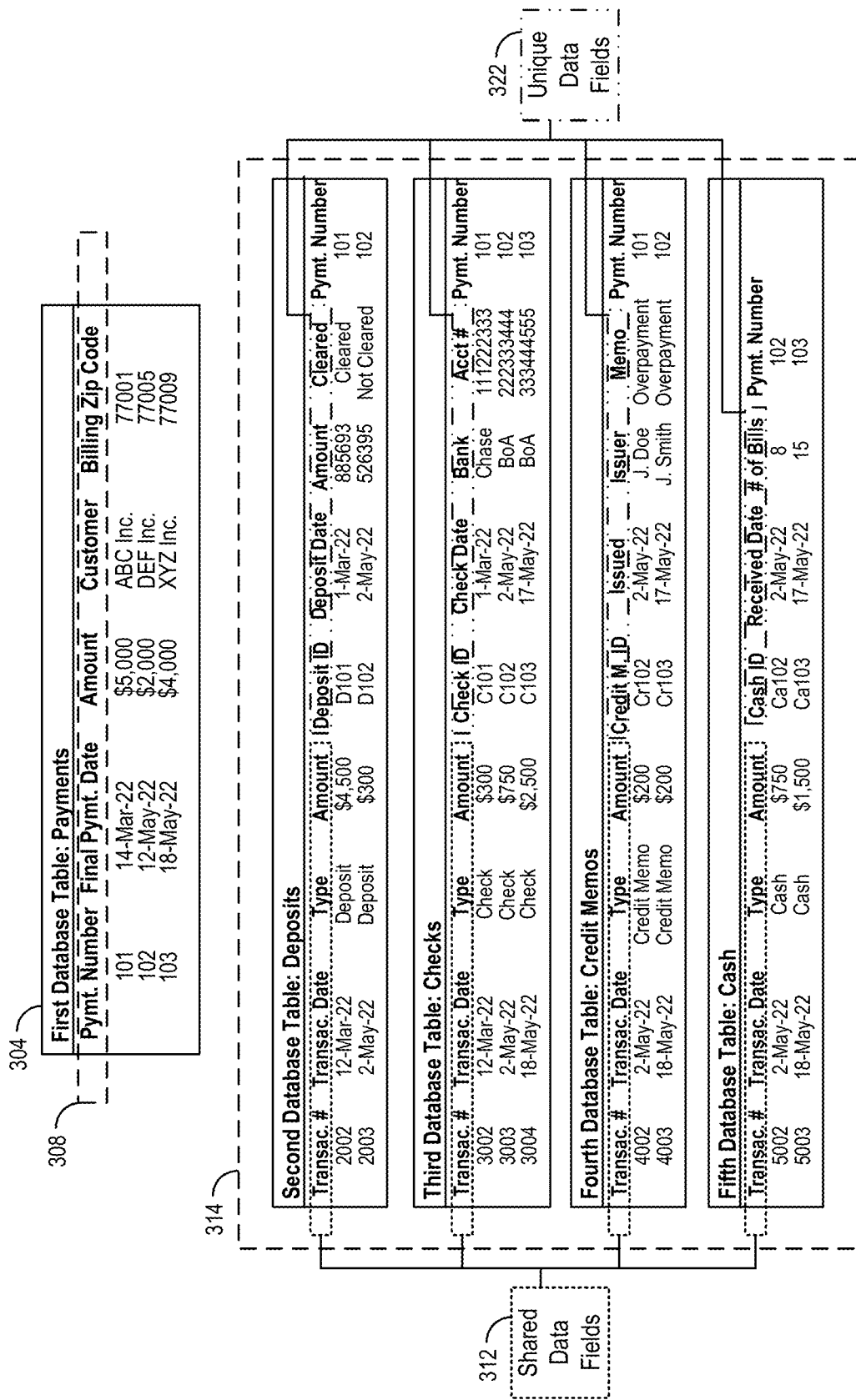
Figure 3B:
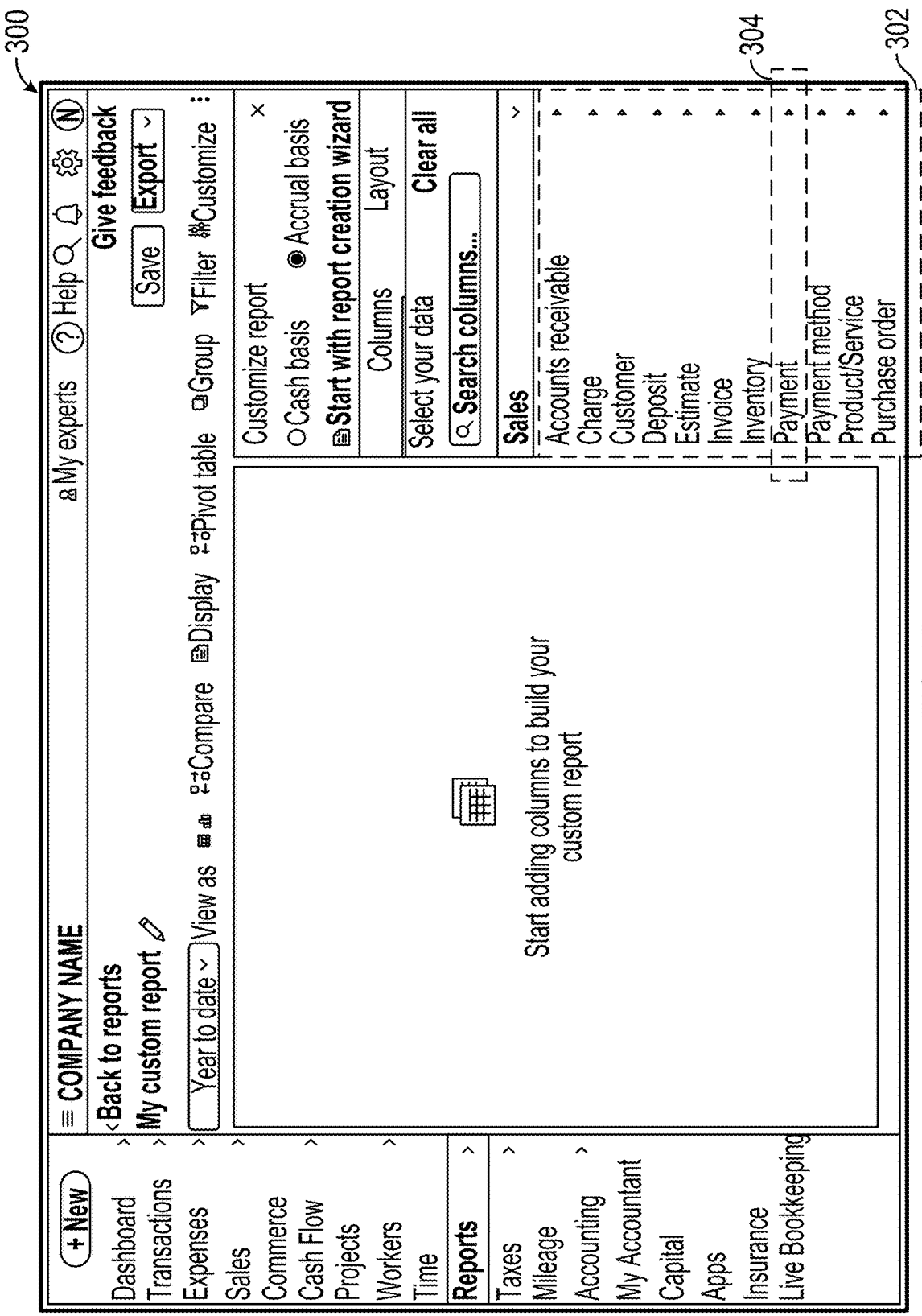

In particular, FIGS. 3A-3F illustrate example report construction using data in database tables illustrated in FIG. 3A, including a first database table 304 and other database tables 314 related to the first database table 304. First database table 304 contains information about three different payment transactions made. Other database tables 314 related to first database table 304 include a second database table including information about deposits made, a third database table including information about checks received, a fourth database table including information about credit memos, and a fifth database table including information about cash received.

Each of the other database tables 314 may be related to the first database table based on equal values for a Payment Number data field common to each of the other database tables 314 and the first database table 304. For example, first database table 304 and the second database table each include information for payment numbers 101 and 102. Thus, a JOIN relationship exists between the first database table 304 and the second database table.

Each of the first database table 304 and other database tables 314 includes multiple rows with multiple columns, where each column corresponds to a data field specific to the corresponding database table. Data fields shared among all of the other database tables 314 (e.g., referred to as shared data fields 312) include a Transaction #, Transaction Date, Type, and Amount. Further, unique data fields 322 include Deposit ID, Deposit Date, Amount, and Cleared data fields from the second database table, Check ID, Check Date, Bank, and Account # data fields from the third database table, Credit Memo ID, Issued, Issuer, and Memo data fields from the fourth database table, and Cash ID, Received Date, and # of Bills data fields from the fifth database table. As described in detail below, each of these shared data fields 312 and unique data fields 322 may be displayed to a user via an interactive user interface for efficient report construction incorporating data stored in first database table 304 and other database tables 314.

Method 200 begins, at step 202, by receiving, via an interactive user interface, a selection of a first database table from a plurality of database tables displayed as a plurality of database table labels via the interactive user interface. For example, in FIG. 3B, first database table 304 and other database tables 314 in FIG. 3A are displayed as a plurality of database table labels 302 in an interactive user interface 300. At step 202, a selection of first database table 304 is selected from the list of displayed database table labels (e.g., a user selects the "Payments" label displayed and associated with the first database table 304 "Payments').

Method 200 proceeds, at step 204, by generating a visualization of data associated with the selected first database table. The visualization may be organized in one or more rows and one or more columns, or more generally, in a tabular format. Each of the one or more columns includes data for a data field among one or more data fields in the selected first database table.

Figure 3C:
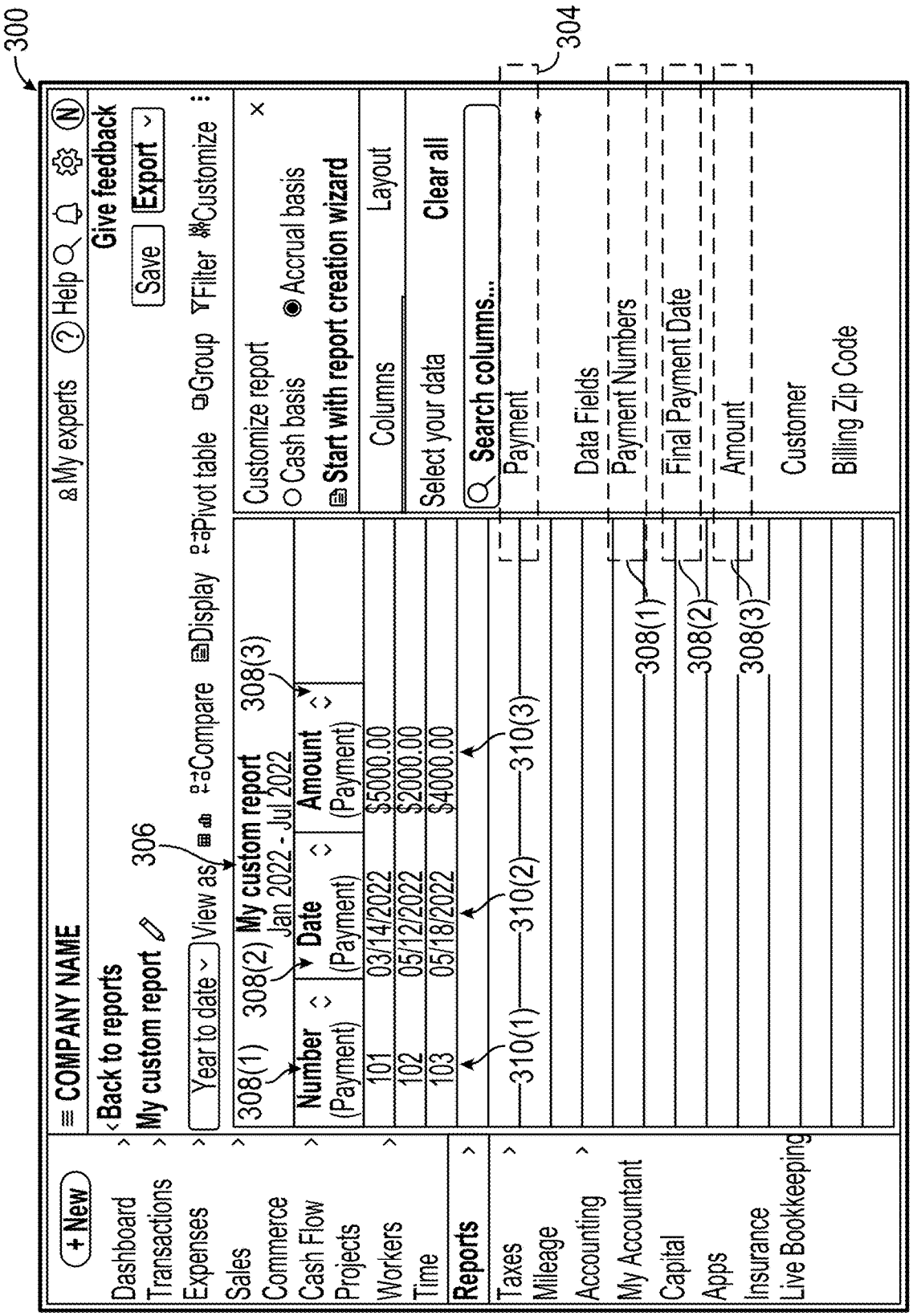

As shown in FIG. 3A, data fields of the first database table 304 include a Payment Number data field, a Final Payment Date data field, an Amount data field, a Customer data field, and a Billing Zip Code data field. These data fields may be displayed, via the interactive user interface, for user interaction. As shown in FIG. 3C, a user may select to display data 310(1) for the Payment Number data field 308(1), data 310(2) for the Final Payment Date data field 308(2), and data 310(3) for the Amount data field 308(3) of first database table 304. This information may be displayed in a visualization 306 (e.g., a custom report). For example, this data may be added as three columns and four rows in visualization 306. Although this example illustrates a user selecting less than all of the data fields of the first database table for display, in some other examples a user may select all of the data fields and/or different data fields than those illustrated in this example.

Method 200 proceeds, at step 206, by displaying, via the interactive user interface, one or more shared data fields associated with other database tables related to the first database table and shared among all of the other database tables. The other database tables are related to the first database table via equal values for at least one data field common to each of the other database tables and the first database table.

Figure 3D:
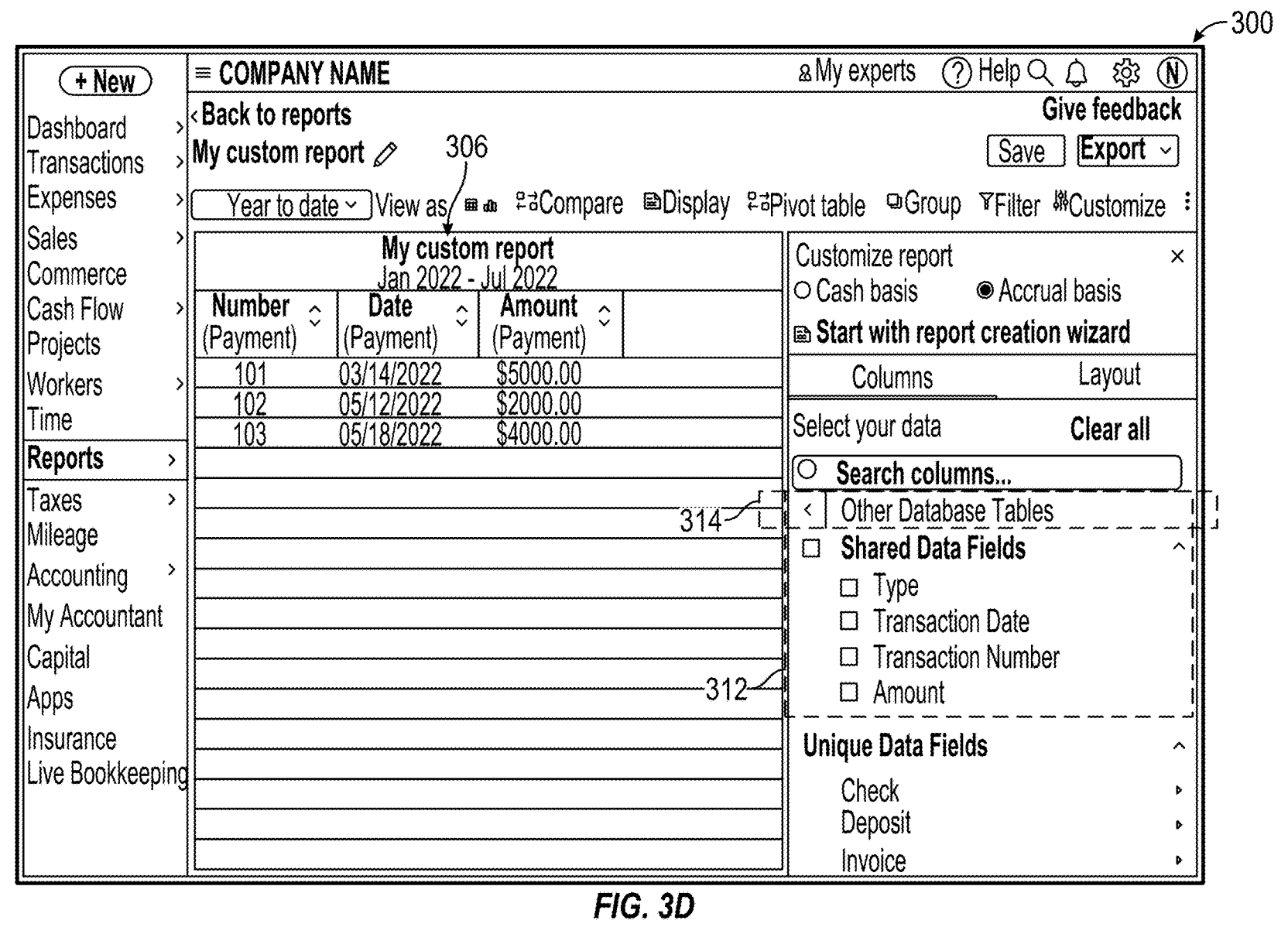

As described above with respect to FIG. 3A, the second database table, the third database table, the fourth database table, and the fifth database table are all related to the first database table based on equal payment number values found in a Payment Number data field/column common to each of the other database tables 314 and first database table 304. Data fields shared among all of the other database tables 314 (e.g., referred to as shared data fields 312) include a Transaction #, Transaction Date, Type, and Amount. As illustrated in FIG. 3D, each of these shared data fields 312 are displayed, at step 206, in the interactive user interface 300 under a shared data fields header.

Method 200 proceeds, at step 208, by receiving, via the interactive user interface, a selection of a first shared data field from the one or more shared data fields displayed. Further, at step 210, method 200 proceeds by displaying, via the interactive user interface, data for the first shared data field from all the other database tables in a first new column added to the visualization. Each row in the first new column includes data from one of the other database tables.

Figure 3E:
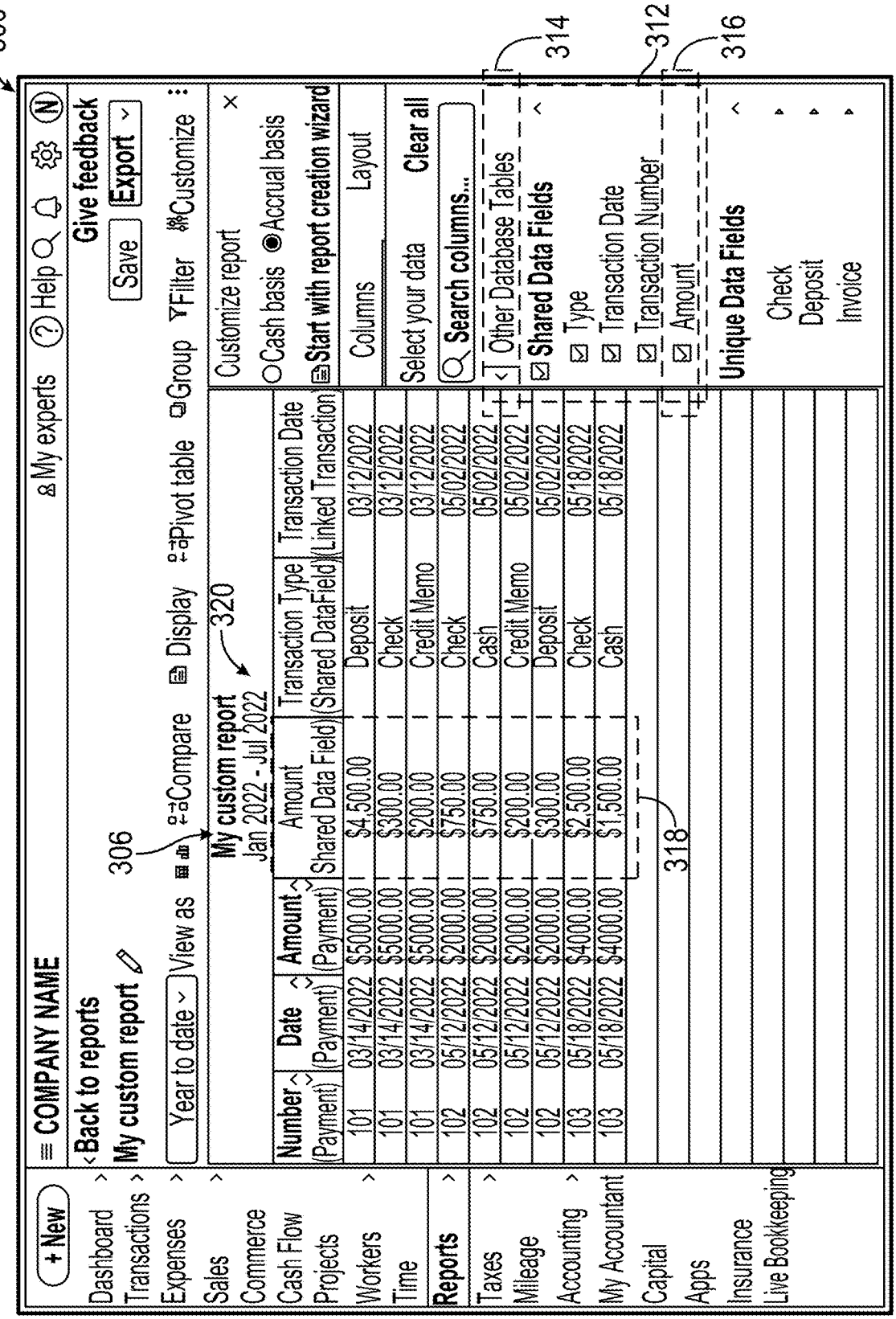

For example, as illustrated in FIG. 3E, a user selects a first shared data field 316 from the one or more shared data fields 312 displayed as the Amount data field. Accordingly, a first new column 320 is added to visualization 306 to display Amount data field data 318 from each of the other database tables 314 related to first database table 304. In particular, each row in first new column 320 includes data from one of the other database tables 314. For example, the last row of visualization 306, displaying an amount of $1,500.00, represents data included in the fifth database table (e.g., Cash database table) illustrated in FIG. 3A. FIG. 3E further illustrates a user selecting the remaining shared data fields such that data for these shared data fields 312 from other database tables 314 are also added to visualization 306 as new columns of data.

Optionally, in some cases, method 200 proceeds, at step 212, by displaying, via the interactive user interface, one or more unique data fields associated with at least one of the other database tables and less than all of the other database tables.

Figure 3F:
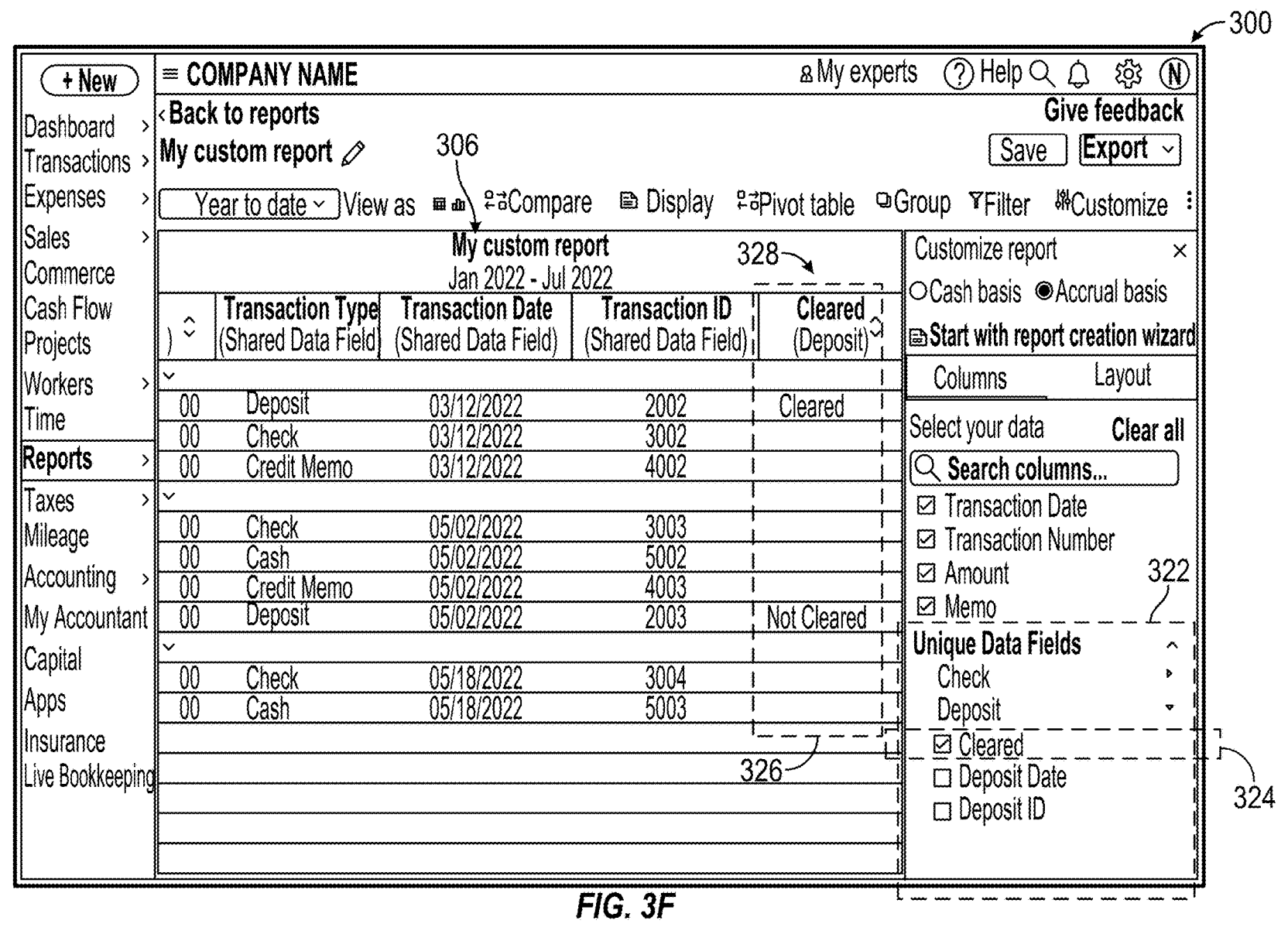

As described above with respect to FIG. 3A, unique data fields 322 for other database tables 314 (e.g., the second database table, the third database table, the fourth database table, and the fifth database table) includes Deposit ID, Deposit Date, Amount, and Cleared data fields from the second database table, Check ID, Check Date, Bank, and Account # data fields from the third database table, Credit Memo ID, Issued, Issuer, and Memo data fields from the fourth database table, and Cash ID, Received Date, and # of Bills data fields from the fifth database table. As illustrated in FIG. 3F, one or more of these unique data fields 322 are displayed, at step 212, in the interactive user interface 300 under a unique data fields header.

Optionally, method 200 proceeds, at step 214, by receiving, via the interactive user interface, a selection of a first unique data field from the one or more unique data fields displayed. Further, at step 216, method 200 optionally proceeds by displaying, via the interactive user interface, data for the first unique data field associated with at least one of the other database tables in a second new column added to the visualization. Less than all rows in the second new column may include data (e.g., because less than all other database tables include the first unique data field, nor data for the first unique data field).

For example, as illustrated in FIG. 3F, a user selects a first unique data field 324 from the one or more unique data fields 322 displayed as the Cleared data field from the second database table (e.g., Deposits database table). Accordingly, a second new column 328 is added to visualization 306 to display Cleared data field data 326 from the second database table. In particular, only rows in second new column 328 related to deposits included in the second database table may have a data value identified in second new column 328.

In certain aspects, after visualization 306 is constructed to incorporate data stored in first database table 304 and other database tables 314, a user may be able to filter data in visualization 306. For example, a user may filter the data in visualization 306 by unique payment number values included in the Payment Number data field/column (e.g., to see only data for payment 101, payment 102, and/or payment 103).

Note that FIG. 3 is just one example of a method, and other methods including fewer, additional, or alternative steps are consistent with this disclosure.

Figure 4A:
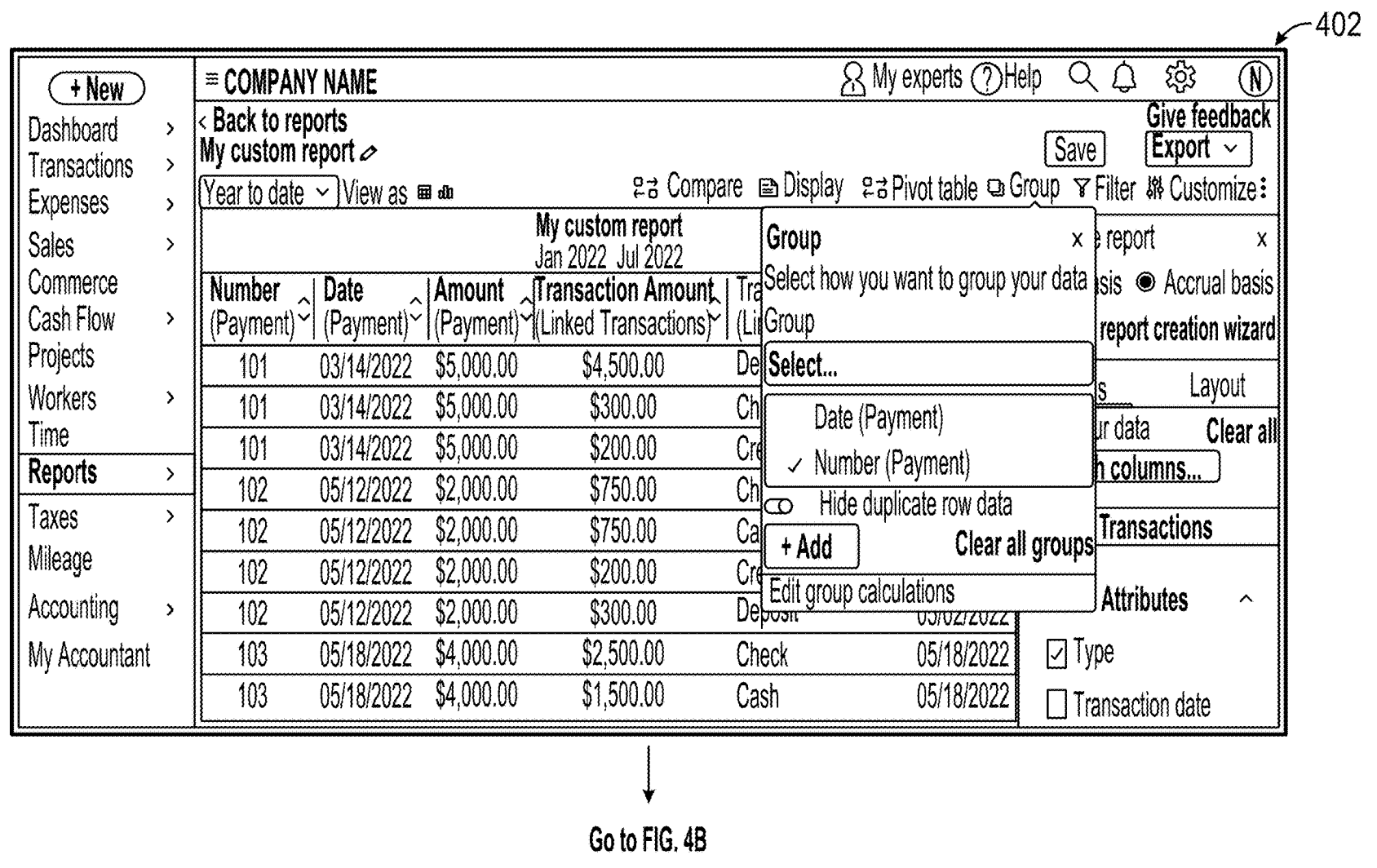
Figure 4B:
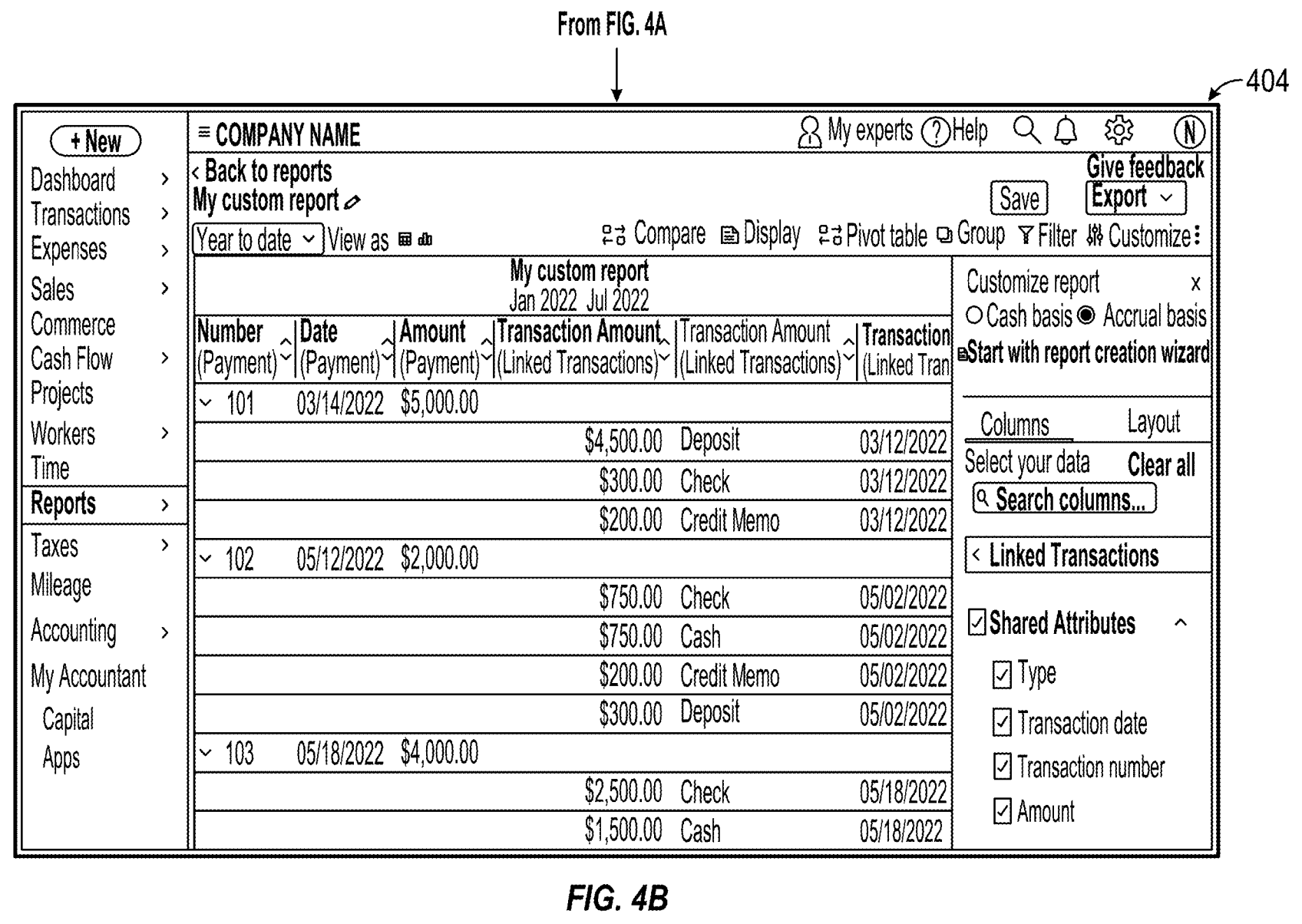

FIGS. 4A-4B illustrate an example of grouping report data, such as report data displayed in FIG. 3E. In particular, when displaying data for a first shared data field from all the other database tables associated with a selected first database table, data displayed for the selected first database table may be duplicated. For example, as shown at 402 in FIG. 4A, information for payment 101 may be duplicated three times, information for payment 102 may be duplicated four times, and information for payment 103 may be duplicated two times.

In certain aspects, to remove duplicated data, rows including equal values for data fields of the first database table are grouped together into a single row. For example, as shown at 404 in FIG. 4B, the three duplicates of payment 101 are combined into information displayed in a single row. Similar grouping is also provided for payments 102 and 103. Each single row may be created as a drop down, such that when the row is selected, all information associated with that row is shown. For example, when the row for payment 101 is selected, all information associated with payment 101 is displayed in visualization 306.

Figure 5:
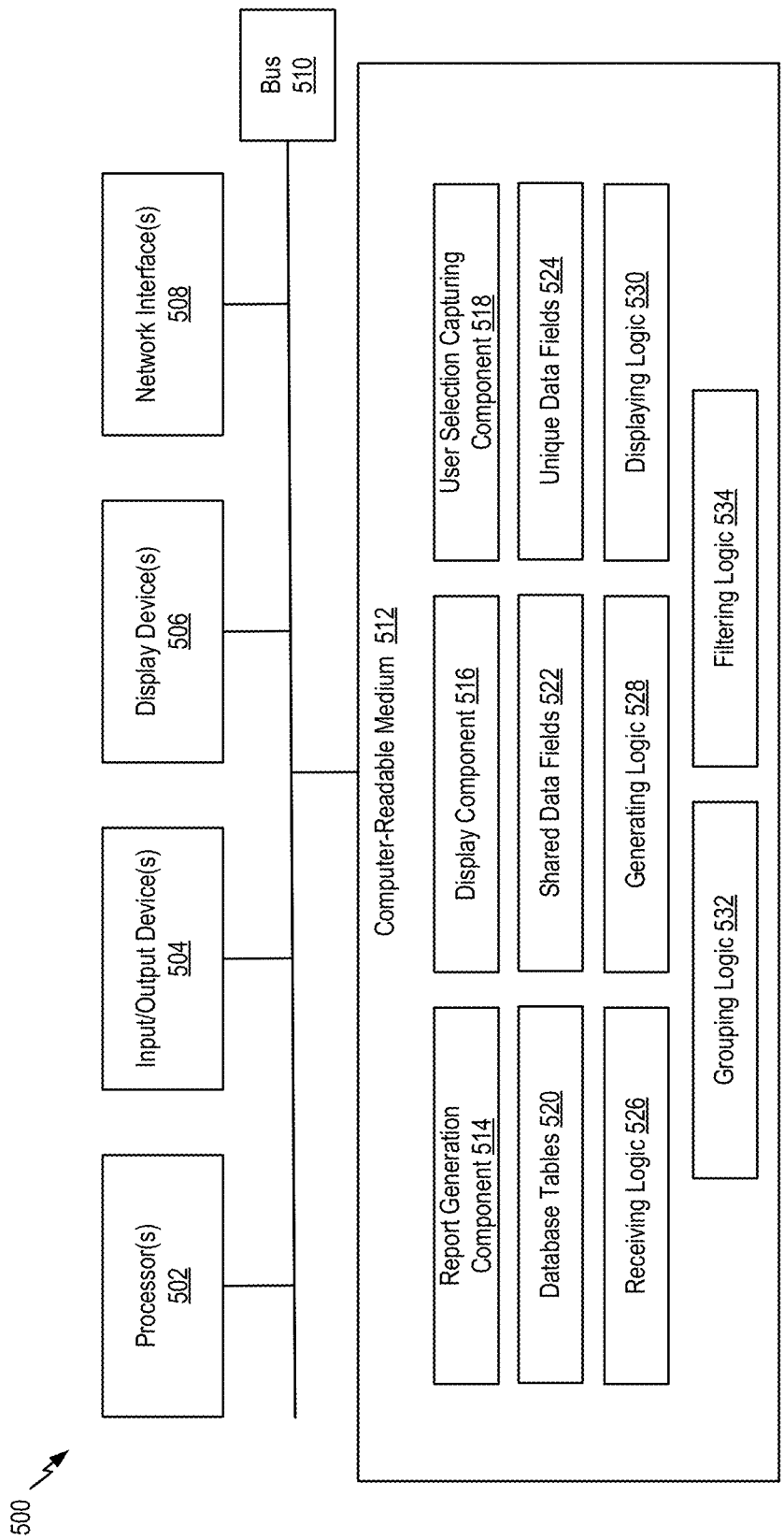
FIG. 5 illustrates an example processing system on which aspects of the present disclosure can be performed.

Example Processing System for Constructing a Report Incorporating Data Stored in a Plurality of Database Tables FIG. 5 depicts an example processing system 500 configured to perform various aspects described herein, including, for example, method 200 as described above with respect to FIG. 2 and the example described with respect to FIGS. 3A-3F.

Processing system 500 is generally be an example of an electronic device configured to execute computer-executable instructions, such as those derived from compiled computer code, including without limitation personal computers, tablet computers, servers, smart phones, smart devices, wearable devices, augmented and/or virtual reality devices, and others.

In the depicted example, processing system 500 includes one or more processors 502, one or more input/output devices 504, one or more display devices 506, and one or more network interfaces 508 through which processing system 500 is connected to one or more networks (e.g., a local network, an intranet, the Internet, or any other group of processing systems communicatively connected to each other), and computer-readable medium 512.

In the depicted example, the aforementioned components are coupled by a bus 510, which may generally be configured for data and/or power exchange amongst the components. Bus 510 may be representative of multiple buses, while only one is depicted for simplicity.

Processor(s) 502 are generally configured to retrieve and execute instructions stored in one or more memories, including local memories like the computer-readable medium 512, as well as remote memories and data stores. Similarly, processor(s) 502 are configured to retrieve and store application data residing in local memories like the computer-readable medium 512, as well as remote memories and data stores. More generally, bus 510 is configured to transmit programming instructions and application data among the processor(s) 502, display device(s) 506, network interface(s) 508, and computer-readable medium 512. In certain embodiments, processor(s) 502 are included to be representative of a one or more central processing units (CPUs), graphics processing unit (GPUs), tensor processing unit (TPUs), accelerators, and other processing devices.

Input/output device(s) 504 may include any device, mechanism, system, interactive display, and/or various other hardware components for communicating information between processing system 500 and a user of processing system 500. For example, input/output device(s) 504 may include input hardware, such as a keyboard, touch screen, button, microphone, and/or other device for receiving inputs from the user. Input/output device(s) 504 may further include display hardware, such as, for example, a monitor, a video card, and/or other another device for sending and/or presenting visual data to the user. In certain embodiments, input/output device(s) 504 is or includes a graphical user interface.

Display device(s) 506 may generally include any sort of device configured to display data, information, graphics, user interface elements, and the like to a user. For example, display device(s) 506 may include internal and external displays such as an internal display of a tablet computer or an external display for a server computer or a projector. Display device(s) 506 may further include displays for devices, such as augmented, virtual, and/or extended reality devices.

Network interface(s) 508 provide processing system 500 with access to external networks and thereby to external processing systems. Network interface(s) 508 can generally be any device capable of transmitting and/or receiving data via a wired or wireless network connection. Accordingly, network interface(s) 508 can include a communication transceiver for sending and/or receiving any wired and/or wireless communication. For example, Network interface(s) 508 may include an antenna, a modem, a LAN port, a Wi-Fi card, a WiMAX card, cellular communications hardware, near-field communication (NFC) hardware, satellite communication hardware, and/or any wired or wireless hardware for communicating with other networks and/or devices/systems. In certain embodiments, network interface(s) 508 includes hardware configured to operate in accordance with the Bluetooth® wireless communication protocol.

Computer-readable medium 512 may be a volatile memory, such as a random access memory (RAM), or a nonvolatile memory, such as nonvolatile random access memory, phase change random access memory, or the like. In this example, computer-readable medium 512 includes report generation component 514, display component 516, user selection capturing component 518, database tables 520, shared data fields 522, unique data fields 524, receiving logic 526, generating logic 528, displaying logic 530, grouping logic 532, and filtering logic 534.

In certain embodiments, report generation component 514 is configured to generate a report incorporating data stored in a plurality of database tables.

In certain embodiments, display component 516 is configured to display, via an interactive user interface, one or more shared data fields and/or one or more unique data fields for a plurality of database tables.

In certain embodiments, user selection capturing component 518 is configured to receive user selections regarding database table selections, shared data field selections, and/or unique data field selections.

In certain embodiments, database tables 520 are collections of related data held in table formats within a database.

In certain embodiments, shared data fields 522 include data fields shared among all database tables related to a selected database table.

In certain embodiments, unique data fields 524 include data fields shared with less than all database tables related to a selected database table.

In certain embodiments, receiving logic 526 includes logic for receiving, via an interactive user interface, a selection of a first database table from the plurality of database tables displayed as a plurality of database table labels via the interactive user interface. In certain embodiments, receiving logic 526 includes logic for receiving, via the interactive user interface, a selection of a first shared data field from the one or more shared data fields displayed. In certain embodiments, receiving logic 526 includes logic for receiving, via the interactive user interface, a selection of a first unique data field from the one or more unique data fields displayed.

In certain embodiments, generating logic 528 includes logic for generating a visualization of data associated with the selected first database table organized in one or more rows and one or more columns, wherein each of the one or more columns includes data for a data field in the selected first database table.

In certain embodiments, displaying logic 530 includes logic for displaying, via the interactive user interface, one or more shared data fields associated with other database tables related to the first database table and shared among all of the other database tables, wherein the other database tables are related to the first database table via equal values for at least one data field common to each of the other database tables and the first database table. In certain embodiments, displaying logic 530 includes logic for displaying, via the interactive user interface, data for the first shared data field from all the other database tables in a first new column added to the visualization, wherein each row in the first new column includes data from one of the other database tables. In certain embodiments, displaying logic 530 includes logic for displaying, via the interactive user interface, one or more unique data fields associated with at least one of the other database tables and less than all of the other database tables. In certain embodiments, displaying logic 530 includes logic for displaying, via the interactive user interface, data for the first unique data field associated with at least one of the other database tables in a second new column added to the visualization, wherein less than all rows in the second new column include data. In certain embodiments, displaying logic 530 includes logic for displaying the data in rows with duplicate values for one or more of the data fields in the selected first database table.

In certain embodiments, grouping logic 532 includes logic for grouping the rows in the visualization comprising duplicate values for a first data field of the one or more data fields.

In certain embodiments, filtering logic 534 includes logic for filtering the data in the visualization by values of the first data field.

Note that FIG. 5 is just one example of a processing system consistent with aspects described herein, and other processing systems having additional, alternative, or fewer components are possible consistent with this disclosure.

Example Clauses

Implementation examples are described in the following numbered clauses:

Clause 1: A method of constructing a report incorporating data stored in a plurality of database tables, comprising: receiving, via an interactive user interface, a selection of a first database table from the plurality of database tables displayed as a plurality of database table labels via the interactive user interface; generating a visualization of data associated with the selected first database table organized in one or more rows and one or more columns, wherein each of the one or more columns includes data for a data field among one or more data fields in the selected first database table; displaying, via the interactive user interface, one or more shared data fields associated with other database tables related to the first database table and shared among all of the other database tables, wherein the other database tables are related to the first database table via equal values for at least one data field common to each of the other database tables and the first database table; receiving, via the interactive user interface, a selection of a first shared data field from the one or more shared data fields displayed; and displaying, via the interactive user interface, data for the first shared data field from all the other database tables in a first new column added to the visualization, wherein each row in the first new column includes data from one of the other database tables.

Clause 2: The method of Clause 1, further comprising displaying, via the interactive user interface, one or more unique data fields associated with at least one of the other database tables and less than all of the other database tables; receiving, via the interactive user interface, a selection of a first unique data field from the one or more unique data fields displayed; and displaying, via the interactive user interface, data for the first unique data field associated with at least one of the other database tables in a second new column added to the visualization, wherein less than all rows in the second new column include data.

Clause 3: The method of any one of Clauses 1-2, wherein displaying the data for the first shared data field from all the other database tables comprises displaying the data in rows with duplicate values for one or more of the data fields in the selected first database table.

Clause 4: The method of Clause 3, further comprising grouping the rows in the visualization comprising duplicate values for a first data field of the one or more data fields.

Clause 5: The method of Clause 4, further comprising filtering the data in the visualization by values of the first data field.

Clause 6: The method of any one of Clauses 1-5, wherein the plurality of database tables comprise a plurality of transaction tables.

Clause 7: The method of Clause 6, wherein: the first database table comprises a payments table, and the other database tables related to the first database table comprise one or more of a deposits table, a checks table, a credit memos table, or a cash table.

Clause 8: The method of Clause 7, where the other database tables and the first database table comprise equal values for a payment number data field in each of the first database table and the other database tables.

Clause 9: The method of Clause 6, wherein: the first database table comprises an invoices table or a payments table, and the other database tables related to the first database table comprise at least the other of the invoice table or the payments table that is not the first database table.

Clause 10: The method of Clause 6, wherein: the first database table comprises a bills table or an applied payments table, and the other database tables related to the first database table comprise at least the other of the bills table or the applied payments table that is not the first database table.

Clause 11: A processing system, comprising: a memory comprising computer-executable instructions; and a processor configured to execute the computer-executable instructions and cause the processing system to perform a method in accordance with any one of Clauses 1-10.

Clause 12: A processing system, comprising means for performing a method in accordance with any one of Clauses 1-10.

Clause 13: A non-transitory computer-readable medium storing program code for causing a processing system to perform the steps of any one of Clauses 1-10.

Clause 14: A computer program product embodied on a computer-readable storage medium comprising code for performing a method in accordance with any one of Clauses 1-10.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of constructing a report incorporating data stored in a plurality of database tables, comprising:
   receiving, via an interactive user interface, a selection of a first database table from the plurality of database tables displayed as a plurality of database table labels via the interactive user interface;
   generating a visualization of data associated with the selected first database table organized in one or more rows and one or more columns, wherein each of the one or more columns includes data for a data field among one or more data fields in the selected first database table;

displaying, via the interactive user interface, one or more shared data fields associated with other database tables related to the first database table and shared among all of the other database tables, wherein the other database tables are related to the first database table via equal values for at least one data field common to each of the other database tables and the first database table;

receiving, via the interactive user interface, a selection of a first shared data field from the one or more shared data fields displayed; and displaying, via the interactive user interface, data for the first shared data field from all the other database tables in a first new column added to the visualization, wherein each row in the first new column includes data from one of the other database tables.

2. The method of claim 1, further comprising:

displaying, via the interactive user interface, one or more unique data fields associated with at least one of the other database tables and less than all of the other database tables;

receiving, via the interactive user interface, a selection of a first unique data field from the one or more unique data fields displayed; and displaying, via the interactive user interface, data for the first unique data field associated with at least one of the other database tables in a second new column added to the visualization, wherein less than all rows in the second new column include data.

3. The method of claim 1, wherein displaying the data for the first shared data field from all the other database tables comprises displaying the data in rows with duplicate values for at least one data field of the one or more data fields in the selected first database table.

4. The method of claim 3, further comprising grouping the rows in the visualization comprising duplicate values for a first data field of the at least one data field.

5. The method of claim 4, further comprising filtering the data in the visualization by values of the first data field.

6. The method of claim 1, wherein the plurality of database tables comprise a plurality of transaction tables.

7. The method of claim 6, wherein:

the first database table comprises a payments table, and the other database tables related to the first database table comprise one or more of a deposits table, a checks table, a credit memos table, or a cash table.

8. The method of claim 7, where the other database tables and the first database table comprise equal values for a payment number data field in each of the first database table and the other database tables.

9. The method of claim 6, wherein:

the first database table comprises an invoices table or a payments table, and the other database tables related to the first database table comprise at least the other of the invoices table or the payments table that is not the first database table.

10. The method of claim 6, wherein:

the first database table comprises a bills table or an applied payments table, and the other database tables related to the first database table comprise at least the other of the bills table or the applied payments table that is not the first database table.

11. A processing system, comprising:

a memory comprising computer-executable instructions; and a processor configured to execute the computer-executable instructions and cause the processing system to:

receive, via an interactive user interface, a selection of a first database table from a plurality of database tables displayed as a plurality of database table labels via an interactive user interface;

generate a visualization of data associated with the selected first database table organized in one or more rows and one or more columns, wherein each of the one or more columns includes data for a data field in the selected first database table;

display, via the interactive user interface, one or more shared data fields associated with other database tables related to the first database table and shared among all of the other database tables, wherein the other database tables are related to the first database table via equal values for at least one data field common to each of the other database tables and the first database table;

receive, via the interactive user interface, a selection of a first shared data field from the one or more shared data fields displayed; and display, via the interactive user interface, data for the first shared data field from all the other database tables in a first new column added to the visualization, wherein each row in the first new column includes data from one of the other database tables.

12. The processing system of claim 11, wherein the processor is further configured to cause the processing system to:

display, via the interactive user interface, one or more unique data fields associated with at least one of the other database tables and less than all of the other database tables;

receive, via the interactive user interface, a selection of a first unique data field from the one or more unique data fields displayed; and display, via the interactive user interface, data for the first unique data field associated with at least one of the other database tables in a second new column added to the visualization, wherein less than all rows in the second new column include data.

13. The processing system of claim 11, wherein to display the data for the first shared data field from all the other database tables comprises to display the data in rows with duplicate values for at least one data field of the one or more data fields in the selected first database table.

14. The processing system of claim 13, wherein the processor is further configured to cause the processing system to group the rows in the visualization comprising duplicate values for a first data field of the at least one data field.

15. The processing system of claim 14, wherein the processor is further configured to cause the processing system to filter the data in the visualization by values of the first data field.

16. The processing system of claim 11, wherein the plurality of database tables comprise a plurality of transaction tables.

17. The processing system of claim 16, wherein:

the first database table comprises a payments table, and the other database tables related to the first database table comprise one or more of a deposits table, a checks table, a credit memos table, or a cash table.

18. The processing system of claim 17, where the other database tables and the first database table comprise equal values for a payment number data field in each of the first database table and the other database tables.

19. The processing system of claim 16, wherein:
the first database table comprises an invoices table or a payments table, and
the other database tables related to the first database table comprise at least the other of the invoices table or the payments table that is not the first database table.

20. The processing system of claim 16, wherein:
the first database table comprises a bills table or an applied payments table, and
the other database tables related to the first database table comprise at least the other of the bills table or the applied payments table that is not the first database table.

* * * * *